Patented June 6, 1933

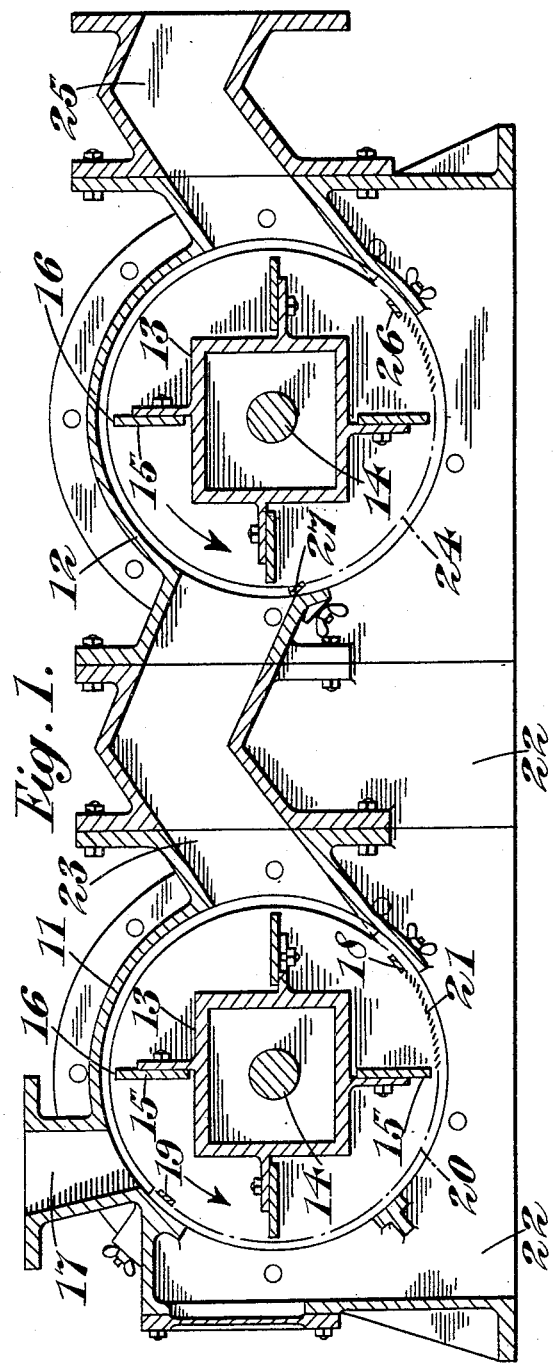

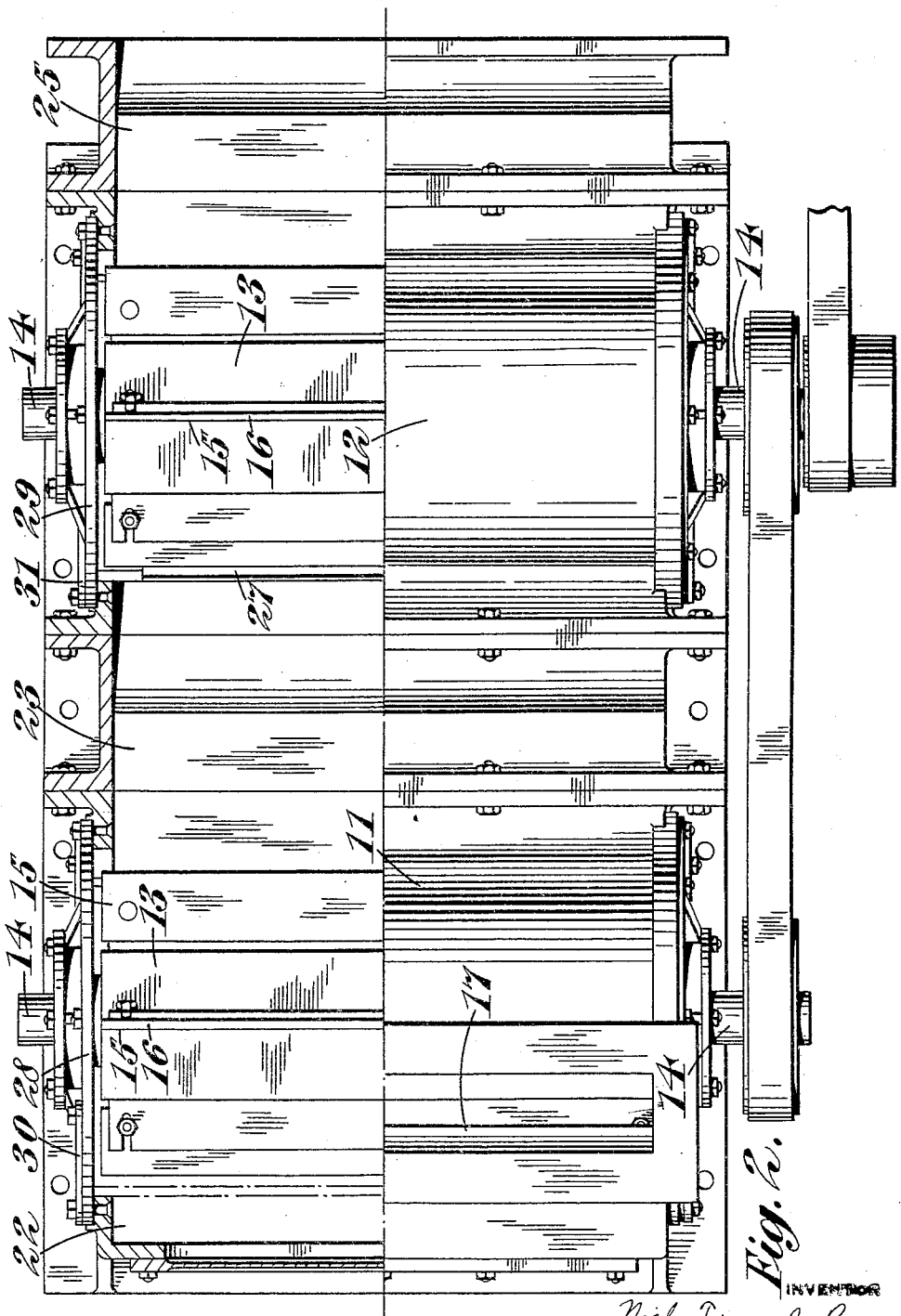

1,912,472

UNITED STATES PATENT OFFICE

NOEL TIMPERLY BRYAN, OF BERMONDSEY, LONDON, ENGLAND, ASSIGNOR TO THE ASSOCIATED LONDON FLOUR MILLERS LIMITED, OF LONDON, ENGLAND, A BRITISH COMPANY

TREATMENT OF WHEAT AND FLOUR

Application filed November 14, 1930, Serial No. 495,665, and in Great Britain February 3, 1930.

This invention comprises improvements in or relating to the treatment of wheat and flour.

Wheat commonly contains numbers of impurities and much dirt which are removed, before grinding into flour, in various types of cleaning apparatus including machines known as cockle cylinders or discs. Among the most difficult substances to remove from wheat is buckwheat, which consists of small triangular seeds of about the same size and specific gravity as broken wheat grain. The final rejects of the cockle disc or cockle cylinder machines (known as wheat points) consists mainly of a mixture of broken wheat grains and buckwheat, and although there is a substantial proportion of good wheat in these rejects there has hitherto existed no known way of utilizing this wheat in the manufacture of flour, for it is not possible to separate the buckwheat from it mechanically. The rejects of the cockle cylinder have, therefore, had to be employed for chicken feed or the like purposes.

I have found that it is possible, by subjecting buckwheat seeds to impact, to split the skins so that they come away from the kernels, and that similar impact can be applied to the wheat grains without seriously damaging them.

According to the present invention a process for the production of flour from wheat containing buckwheat (for example wheat points) comprises subjecting the material to impact to break the skins of the buckwheat, removing said skins from the material and thereafter milling the material from which the skins have been removed.

Preferably the impact is brought about by the movement of rapidly rotating blades or beaters the impact being such as is afforded by the relative velocity of the beaters and the wheat.

The process is also found to be applicable for dealing with seeds other than buckwheat such as mustard seeds for example.

The invention comprises a machine for the treatment of wheat containing buckwheat seeds, mustard seeds etc., having in combination a hollow treatment-drum the interior of which, or a portion thereof, is provided with impact projections, a rotatable beater therein, means to feed material to be treated into the cylinder and an exit for the treated material.

Preferably two such drums are provided in combination, the outlet of one drum being connected to the inlet of the next and the inlet of the second drum being such that the velocity of the material entering the second drum adds to the velocity of impact with the beaters therein.

The accompanying drawings illustrate by way of example one form of apparatus in accordance with the invention and in the drawings:—

Figure 1 is a vertical longitudinal section through the machine, and

Figure 2 is a plan thereof partly in section.

The apparatus comprises two hollow cast iron drums 11, 12. These may be say ten inches in internal diameter and three feet long. The drums 11, 12 are placed close together parallel to one another and each contains a rotatable beater 13 having a square box-like body portion mounted upon a driving shaft 14. Projecting from the middle of each flat side of the beaters 13 is a radially adjustable beater blade 15 which extends for the whole length of the drum in which it rotates. The outer edges 16 of the beater blades rotate in close proximity to the interior of the drum 11. A suitable driving speed for the blades when the drums have the dimensions hereinbefore mentioned is 1600 revolutions per minute.

The first cylinder 11 is provided with a feed spout 17 in its upper half on the side remote from the second cylinder 12, as shown in the drawings. The lower half of the cylinder 11 is cut away over a considerable part of its periphery lying between the bolts 18, 19 and is lined at the cut-away portion with a steel grid which is indicated in the drawings by the chain line 20. The steel grid is punched inwardly at a large number of positions to perforate it and to form by the punched-in portions internal serrations having impact faces which face towards the forward edges of the beater blades 15. A small portion of the inwardly punched surface is shown in the drawings 21. For the purpose of providing this grid a cover of the kind known as a perforated whizzer cover is suitable. The space 22 below the grid 20 is hollow as shown and forms an outlet chamber for fine dusty material.

There is an outlet 23 from the drum 11 on the side which lies towards the second drum 12. The outlet 23 slopes upwardly but about the middle of its length it is given an abrupt nearly right-angled turn downwardly towards the second drum 12 so that it enters the latter only just above the level of the axis thereof in a nearly radial direction. By this means wheat which has been beaten in drum 11 is thrown upwardly through the passage 23 until it beats against the bend in the passage from which it is flung downwardly to meet the advancing beater blades 15 of the drum 12. The velocity of advance of the wheat particles tends to increase the velocity of impact with which the blades 15 meet them.

The second drum or cylinder 12 is provided in its lower half with a perforated grid 24 similar to the grid 20 of drum 11. The grid 24 on its underside likewise opens into the outlet chamber 22. The drum 12 has an upwardly sloping outlet 25 similar to the outlet 23 and likewise provided with an abrupt downward bend in which impact takes place against the walls of the passage.

The perforated plates 20, 24 are removably mounted in the walls of the drums in which they are placed by means of the bolts 18, 19, 26, 27 which are secured with wing nuts.

In order to remove these grids cover plates 28, 29 are provided in the ends of the drums 11, 12 and the cover plates have removable sectors 30, 31. By unbolting the sectors the grids 20, 24 may be withdrawn lengthwise as soon as they have been unbolted by undoing the wing nuts. This permits ready cleaning of the machine without necessitating the dismantling of the end covers 28, 29 themselves, which would be a more extensive operation owing to the fact that the end covers contain the bearings for the beater shafts 14.

The sense of rotation of both the beaters 13 is the same, that is to say, they both rotate in a direction to cause the blades at the top of their movement to move toward the inlet, to sweep downwardly past the same and over the stepped impact surfaces of the grids 21, 24 and to carry the material on to the outlet, through which it is thrown upwardly with violence and caused to impinge against the abrupt angle in the outlet passage. On entering the second chamber the material already has a considerable velocity which assists the force of impact of the blades in their chamber. Wheat points fed to this apparatus, therefore, receive a considerable number of impacts in succession before they finally leave it.

From the outlet 25 the material passes downwardly to an apparatus known as an "effective purifier" in which it falls past a horizontally moving air current and the lighter material, consisting mainly of the skins of buckwheat, which have been broken off the kernels, is drawn away from the wheat proper and the kernels of the buckwheat. The buckwheat kernels are white, and readily milled into flour so that they may be allowed to remain in the product with advantage. The lighter material carried away by the air draught of the effective purifier is separated into two or more portions by dividing blades in a well-known way and of these one portion consists entirely of reject material while the other portion contains some wheat and is returned to the machine for retreatment.

The dusty material in chamber 22 is kept separate and can be mixed into "Wheatfeed".

I claim:

A process for the production of flour from wheat points containing broken wheat and buckwheat which comprises subjecting the material to impact hulling action sufficient to break the skins of the grain in the points without disintegrating the wheat grains or the buckwheat grains, removing said skins from the material and thereafter milling the material from which the skins have been removed.

In testimony whereof I affix my signature.

NOEL TIMPERLY BRYAN.